United States Patent [19]

Sherman

[11] 4,081,832
[45] Mar. 28, 1978

[54] PAY TELEVISION SYSTEM, METHOD AND APPARATUS

[76] Inventor: Herbert Sherman, 25-16 150th St., Flushing, N.Y. 11354

[21] Appl. No.: 693,834

[22] Filed: Jun. 8, 1976

[51] Int. Cl.² .............................................. H04N 1/44
[52] U.S. Cl. ...................................... 358/124; 358/84; 358/121; 358/122
[58] Field of Search ....................... 358/84, 86, 114–124

[56] References Cited

U.S. PATENT DOCUMENTS

| | | | |
|---|---|---|---|
| 3,147,061 | 9/1964 | Walker, Jr. et al. | 358/122 |
| 3,757,035 | 9/1973 | Sullivan | 358/84 |
| 3,777,053 | 12/1973 | Wittig et al. | 358/117 |
| 3,801,732 | 4/1974 | Reeves | 358/124 |
| 3,824,332 | 7/1974 | Horowitz | 358/124 |
| 3,890,461 | 6/1975 | Vogelman et al. | 358/117 |
| 3,919,462 | 11/1975 | Hartung et al. | 358/124 |

*Primary Examiner*—S. C. Buczinski

[57] ABSTRACT

An improved pay TV method and apparatus is disclosed, characterized in that the program to be broadcast is encoded to effect electrical inversion of selected groups of lines of the program, thereby to scramble and disguise the video and audio signals. Simultaneously with the encoding of the program, a card is marked with programming, subscriber and area/month identifying information, which card is transmitted to the subscriber. During the actual broadcasting of the program, the subscriber inserts his card into a punch/reader in the subscriber box unit that is connected with his television receiver. When the subscriber selects a program for paid viewing, his subscriber card is punched, and decoder means operable by information contained on the subscriber's card serve to electrically reinvert those lines which were initially inverted by the encoder means, whereby the program is unscrambled for unimpaired viewing, and the sound is made audible. The subscriber's card is subsequently processed by the broadcaster for the preparation of a bill that is sent to the subscriber.

15 Claims, 9 Drawing Figures

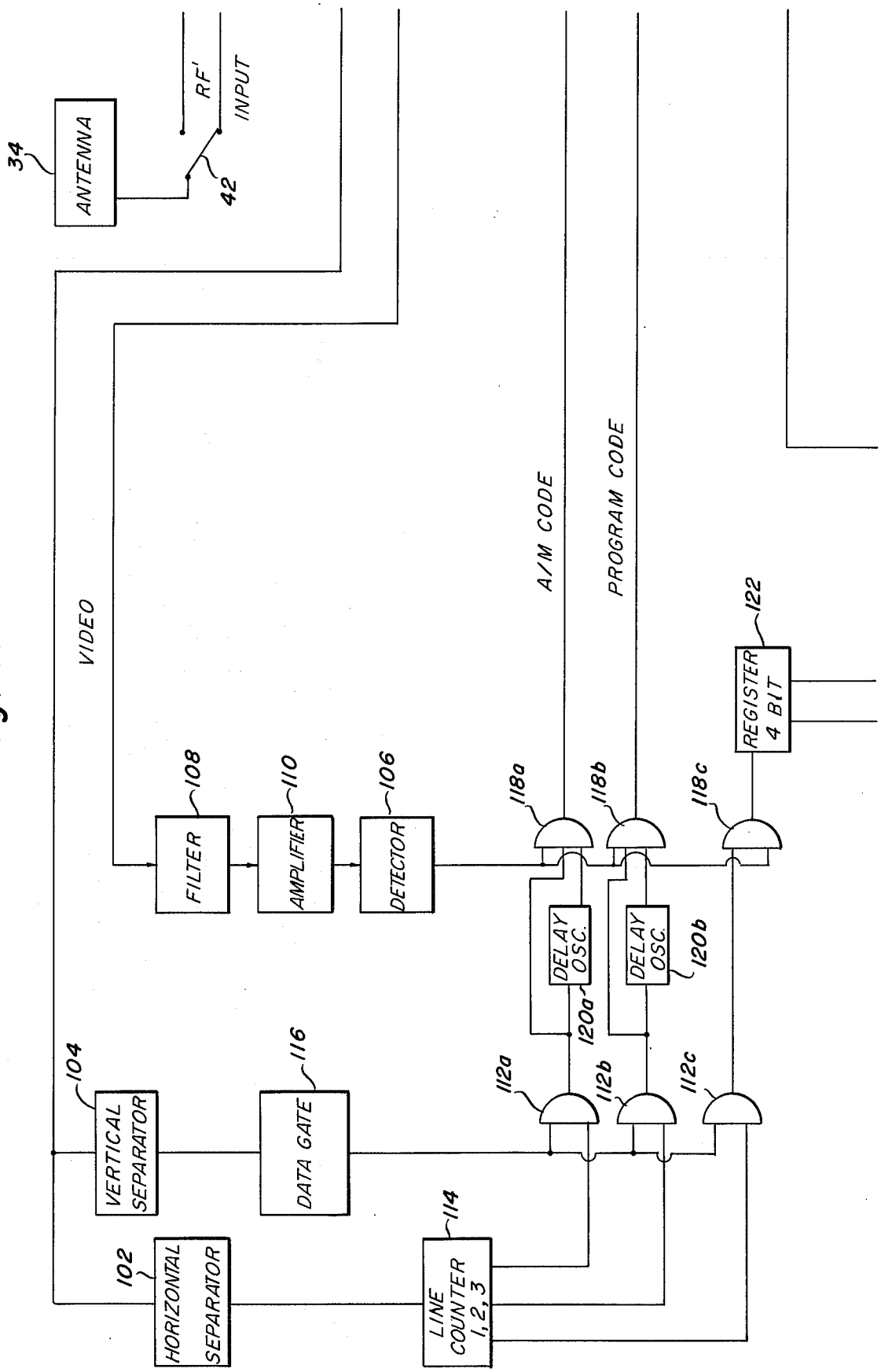

PAY TELEVISION SYSTEM, METHOD AND APPARATUS

BRIEF DESCRIPTION OF THE PRIOR ART

Various pay TV systems have been proposed in the patented prior art, as evidenced for example, by the patent to Horowitz U.S. Pat. No. 3,824,332 and U.S. Pat. No. 3,919,462 to Hartung, et al.

In the prior patent to Horowitz, reference pulses of opposite polarity to the horizontal sync pulses are added to the composite television signal just preceeding each horizontal sync pulse. The video portion of the signal is inverted for randomly selected fields, and coding bursts are added to the composite signal to indicate whether the subsequent field is inverted. The video portion of the received signal is inverted in accordance with coding bursts, and audio program signals are encoded by modulation on a suppressed carrier centered above the audio range. In the patent to Hartung, et al, the differences basically lie in digital vs. analogue control.

While the known systems generally function satisfactorily, they do possess certain inherent drawbacks. For example, in the aforementioned Horowitz patent, if the decoding process is not stable, a flicker may appear since whole fields are involved. The narrow reference pulse used for synchronization during inverted fields contain less energy than standard horizontal sync pulses, and consequently the system exhibits poorer sync stability during noise bursts from ignition or machinery. The program audio spectrum is narrowbanded and shifted, thereby resulting in more distortion and less quieting of the audio. The security of the system will depend on the particular television receiver and the duty cycle of normal transmission as compared to total transmission time.

Other known systems are relatively expensive and inherently lacking in reliability.

For example, the Hartung et al. patent conceptually calls for the transmission of a large amount of data to the subscriber at the beginning of each field. The format is that of a string of narrow pulses. Experience with television has shown that interference from ignnition or airplanes or electrical equipment frequently results in loss of much wider regularly occurring normal television sync pulses. It is known that the use of narrow synchronous data pulses will result in a frequent loss of data and at a minimum a scrambled picture for the following field. The within system, on the other hand, functions with the transmission of much less data than Hartung et al., in a sine wave burst format, which is of longer duration and a previously known frequency, and therefore far less susceptible to interference. The Hartung et al. system moreover proposes to individually address subscribers to turn specific boxes "on or off". To address one in a million subscribers by the Hartung system requires the storage in each box of a long "digital word" comprising perhaps 20 bits and a comparison of this with an off-the-air signal. This calls for a sizeable amount of hardware in the subscriber's box and an associated cost. An inordinate amount of transmission time would be required for the purpose and the probability would be high of turning the wrong subscriber's box "on or off". Only a subscriber complaint would advise the control personnel that the wrong box had been deactivated and this would tend to be considered a maintenance problem until proven otherwise.

The present invention, on the other hand, proposes to assign every 128 subscribers a unique box code, for comparison with the code on the card not over-the-air, i.e. as an I.D. check. Each subscriber's card may be read by the billing computer to one out of 1,000,000. This, then, results in a reasonably high probability that the correct card is in the box and that the billing computer will know to whom the card belongs.

The sheer volume of data utilized by the Harting et al. system makes the data programming, the data processing on billing, the card and the punch, expensive. The impact on the card and punch is of vital concern as a complex card format dictates a complicated or expensive punch. The principal object of the present invention, however, is to transmit the least amount of data required and to utilize a card format which is specifically directed toward simplicity, to assure an inexpensive punch. This has resulted in a punch-reader that is simple, inexpensive and in-line in construction, permitting reading and punch to take place without the use of different stations, after the card has been "registered" in the box for I.D. and area/month identification.

Applicant's assignee hereunder, Pay Television Corporation, owns the following United States Letters Patents, listed hereinafter:

| | | |
|---|---|---|
| 2,816,156 | 2,980,901 | 3,598,938 |
| 2,838,234 | 2,982,952 | 3,716,654 |
| 2,839,598 | 2,983,782 | |
| 2,843,657 | 2,987,576 | |
| 2,847,500 | 2,993,959 | |
| 2,847,501 | 2,994,739 | |
| 2,847,768 | 2,995,624 | |
| 2,852,598 | 2,996,571 | |
| 2,862,048 | 2,999,900 | |
| 2,864,885 | 3,011,016 | |
| 2,864,952 | 3,011,026 | |
| 2,866,961 | 3,014,089 | |
| 2,866,962 | 3,024,455 | |
| 2,872,507 | 3,029,308 | |
| 2,874,977 | 3,029,309 | |
| 2,875,268 | 3,073,892 | |
| 2,881,244 | 3,081,376 | |
| 2,882,398 | 3,081,377 | |
| 2,883,526 | 3,081,378 | |
| 2,889,455 | 3,107,274 | |
| 2,890,269 | 3,119,930 | |
| 2,896,071 | 3,121,803 | |
| 2,896,193 | 3,133,986 | |
| 2,903,686 | 3,138,763 | |
| 2,909,592 | 3,140,346 | |
| 2,910,527 | 3,142,722 | |
| 2,910,553 | 3,147,061 | |
| 2,913,518 | 3,155,211 | |
| 2,915,543 | 3,189,875 | |
| 2,923,764 | 3,192,353 | |
| 2,926,214 | 3,229,302 | |
| 2,929,865 | 3,238,297 | |
| 2,931,854 | 3,268,815 | |
| 2,939,916 | 3,319,257 | |
| Re. 25,521 (of 2,957,939) | 3,396,232 | |
| | 3,466,385 | |
| 2,966,306 | 3,475,547 | |
| 2,966,543 | 3,480,547 | |
| 2,972,009 | 3,484,723 | |
| 2,972,010 | 3,531,582 | |
| 2,973,406 | 3,531,583 | |
| 2,974,305 | 3,538,242 | |

SUMMARY OF THE INVENTION

The present invention relates to an improved pay TV system and method which prevents unauthorized viewing of specially presented programming by means of the digital control of the encoding of groups of picture lines, whereby various groups of picture lines are electrically inverted at the broadcasting station. The same function is used to encode the audio signals. In one embodiment of the system which frequency shifting of the sound on a subcarrier is held on the other, those lines which are to be decoded are controlled by a signal sent over-the-air, and a punched IBM-type card that is supplied to the subscriber of the service for use with hardwired programming in the decoder box that is provided the subscriber. Upon the selection of the desired program by a subscriber, the specially designed IBM-type card is punched for billing purposes, allowing the picture and sound section of the program transmitted to the subscriber's receiver to assume the format required by standard television receivers for normal operation.

Economic considerations demand that the pay TV system be highly reliable and provide high performance at a reasonable cost. Since one subscriber box unit must be provided for each subscriber, the total number of units for decoding the broadcast program is great, and hence the system must have minimum complexity, and yet must comply with the stated objectives for performance as well as security against unauthorized reception.

Another aspect of operation comprises the human interface. To assure minimum difficulty of utilization, the subscriber's participation in the process must be reduced to selecting the program and initiating the billing. A complicated procedure would discourage use and introduce error. The equipment supplied for this system functions in conjunction with an IBM type card for billing which is inserted in the subscriber's box by the subscriber. The subscriber's participation consists herein of registering the card; selecting the program to be viewed and thereafter punching the card for billing. The mails are used to deliver new cards on a periodic basis viz: probably monthly, the subscribers returning the last card on completion of the programming for which the card has been prepunched.

Accordingly, a primary object of the present invention is to provide a subscriber pay TV system and method, including computer-controlled enncoding means for electrically inverting various groups of picture lines and for modulating corresponding portions of the audio signal, simultaneously recording on a subscriber card programming information corresponding to the encoding of the program, providing the card to the subscriber, and substantially simultaneously reading the card at the subscriber station to decode a selected program for recordal of the selected program information on the card for billing purposes. Thus, the decoder means are operable by the program information contained on the card to reinvert those picture lines which were initially inverted by the encoder means, and for demodulating the audio signal.

According to another object of the invention, subscriber box decoding means are provided for decoding one of a plurality of coded broadcast signals. Connected between the subscriber's antenna and the TV receiver are a tuner, an IF detector which detects the video and audio signals, a video polarity switch, and a modulator. The video signal is fed to decoder means for comparison with program information contained on the subscriber's card to operate the video polarity switch in a manner to reinvert those picture lines that were initially inverted by the encoder means, and to demodulate the audio signals accordingly.

In accordance with a more specific object of the invention, the horizontal sync pulses and vertical sync signals of the coded program as well as transmitted control signals are utilized at the subscriber station in conjunction with the programm data on the subscriber's card, to decode the program and to operate the video polarity switch to effect the desired reinversion. Thus, the horizontal sync pulses are separated and fed to a line counter, vertical sync signals are separated and the control signals fed through a data gate. The off-the-air program data information associated with the vertical sync signals is supplied to a program register and to a program comparator which compares the broadcast data information with program information contained on the subscriber's card for releasing the solenoid inhibit means associated with the subscriber's card reading and punch unit.

Similarly, the off-the-air area/month information associated with the vertical sync signals is supplied to a register for comparison with corresponding area/month data contained on the subscriber's card, thereby to produce a signal that is supplied to one input of a first gate to the other input of which is supplied subscriber box identification number information also obtained from the subscriber card. The output of this gate serves to enable the video polarity switch. Furthermore, the separated horizontal and vertical signals are fed to second gate means which control third gate means through which the filtered, amplified and detected video signal is supplied to a 4-bit register for transmittal via fourth gate means to a plurality of group counters that correspond with the groups of inverted lines that are to be reinverted. These fourth gate means are operated by data information obtained from the program portion of the subscriber's card in a preselected sequence. The outputs from the group counters are fed to normally disabled count decoding flip flop means associated with the video polarity switch.

When the subscriber thus elects to pay for a given program, he operates the subscriber program selection means, thereby to operate the punch, to record the selected program information on the subscriber card, enabling the count decoding flip flop means, whereby the video polarity switch is rendered operable to electrically reinvert the desired picture lines and to uncode the coded audio signals.

In accordance with another object of the invention, barker channel means are provided for advising all viewers of program offerings as well as to promote ads for goods and services. The barker channel can be received by any television set as normal audio, differing from the normal broadcast audio only in that the higher frequency information is suppressed. The effect is to yield as much sound information as an ideal broadcast radio receiver with the noise free advantage of FM.

According to the present invention, the picture is encoded by electrically inverting groups of lines, normal unencoded picture lines being transmitted in between the inverted lines. To further the effectiveness of the encoding, the specific lines selected for inversion are continually changed by the code computer means. The overall visual impact is moving bands in the picture that change width and position. The inverted segments have incorrect gray scale and the wrong colors, thereby obscuring the picture. The motion due to the changing picture adds discomfort to the obvious lack of legibility. A program for encoding is selected prior to broadcast and the flexibility is such that the programmer can make changes up to the last minute even though the prepunched cards have been distributed to the subscribers, the only limitation being that the programmer know the codes used to punch the cards. The encoding is dynamic and impossible to predict or circumvent even if one is totally aware of the technical details of the system. Only the correct hardware and card data will permit normal viewing.

In one form of invention, the program within the audio channel is not audible on a standard receiver. A subscriber box is necessary to extract the audio which will emanate from speakers placed in the subscriber box. Audio quality will differ herein from standard broadcast only in that its distortion characteristic is somewhat different. The difference from standard broadcast is inaudible and can only be determined through the use of instrumentation. In this instance, the dual speaker arrangement will in fact result in far better acoustic quality than the average portable television receiver which is typical home equipment.

During installation of the service the antenna or antennas are disconnected from the television receiver and connected to the subscriber box input. The television receiver antenna terminals are then connected to the subscriber box output. To view pay television the switch is activated on the subscriber box which turns "on" the power to the box and switches the antennas. The UHF antenna then feeds the UHF tuner in the box and the signal out of the box is fed to the television receiver on a preselected VHF channel.

The first few minutes of each broadcast is preferably unscrambled so that it may solicit viewing by the subscriber to determine if reception is adequate and if there is a desire to purchase same. To assure a maximum of security only a particular card will be accepted by a box. Whereas the card I.D. code per se is not unique, it repeats. Nonetheless, it is improbable that a subscriber would be able to locate another subscriber with the identical box code.

As a first step prior to viewing, the card is placed in the box and the program selector set to "zero" to register or check if the particular card belongs in the box. If this check is positive, it enables circuitry to initiate the decoding process. Secondly, the subscriber sets the program selector to the program number that is being broadcast. If the selector is set at the correct number, an inhibit pin is retracted in the card punch mechanism and the card may be punched. The punch must remain in the activated position for the decoding process to take place. When the program is completed, the subscriber switches "off" the box, simultaneouly reconnecting antennas to the normal free television configuration.

For billing purposes, there are provided two opposed blocks of 81 columns each of program codes. The first column of each block affords subscriber and box I.D., and the remaining columns of the blocks afford 160 programs. When a program is selected, billing takes place when the subscriber punches holes at the end of the selected column.

The IBM-type card is used to turn on the decoder, identify that the proper program selection has been made and then decode the picture. The card may be printed with the subscriber's name, address, month, etc. It can also be marked at each program column with the cost of each program to permit a visual tally of charges by the subscriber. When the card is received at the billing center, the processing equipment will read the digital coding, identify the subscriber and tally the billing.

Other objects and advantages of the invention will become apparent from a study of the following specification when viewed in the light of the accompanying drawing.

BRIEF DESCRIPTION OF THE FIGURES

FIGS. 4A – D is a detailed block diagram of the decoding means of the subscriber's box, reference FIG. 1.

DETAILED DESCRIPTION OF PREFERRED EMBODIMENTS

Figure 1:
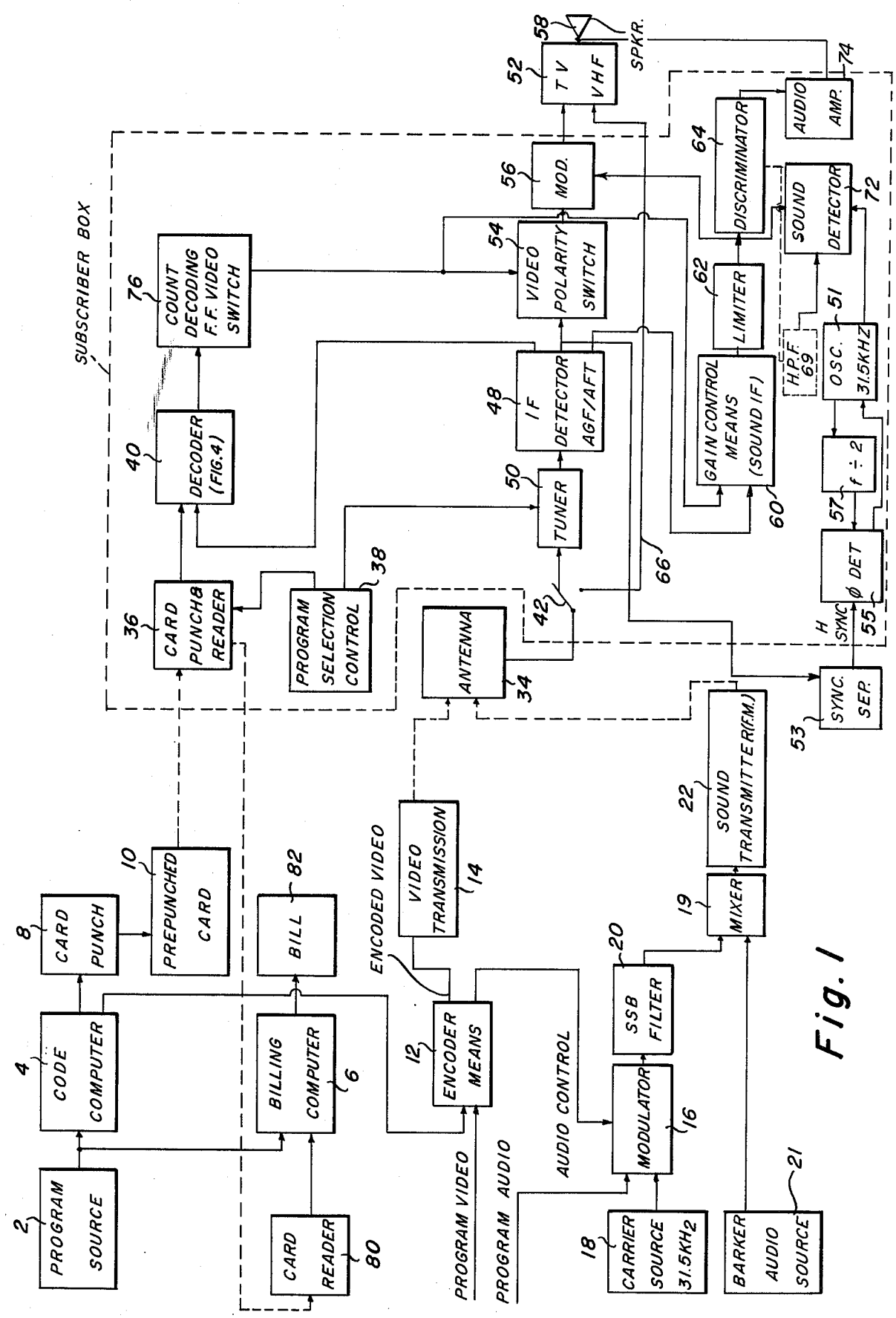
FIG. 1 is a block diagram of the subscriber pay-TV system of the present invention.

Referring first to FIG. 1, the code program is transmitted from the source 2 both to the code computer 4 and to the billing computer 6. Code computer 4 operates a card punch 8 to code program selection information onto the card 10, and to supply the program to encoder means 12 which codes the program video signal and supplies the encoded video signal to the video transmission means 14, and the coded audio control signal to the modulator means 16. Modulator means 16 modulates the program audio signal, as controlled by the audio control signal, with a 31.5KHz carrier supplied by carrier source 18, the resultant modulated signal then being supplied to one input of the mixer 18 via single sideband filter 20. The program announcing barker signal supplied by barker audio source 21 is supplied to the other input terminal of mixer 19, the resultant mixed signal being transmitted to FM transmitter 22. The video and audio signals are then transmitted to the antenna 34 of the subscriber.

As indicated, the prepunched data processing card 10 (FIG. 2), which may be supplied to the subscriber by mail, contains not only subscriber identification information 12, but also program selection data 14, corresponding to the various pay TV programs being provided. Columns 15 and 15′ represent area and account codes whereas columns 1–80 designated elements 17 and 17′ represent the vailable programs. The subscriber thus places his card 10 into the card punch reader 36. Each program is transmitted in uncoded form for a short period of time, as for example, for a few minutes, to permit a determination by the subscriber as to whether or not he desires to purchase the program for viewing. Furthermore, the subscriber now has an opportunity to properly tune his receiver to the program. Assuming that the subscriber desires a selected program determined by the program selection control means 38, he operates the card punch 36 to impart to the card a record of the selected program, whereupon an actuating signal is sent to the decoder 40, the details of which will be described with reference to FIG. 4.

Referring again to FIG. 1:

The video and sound signals which are transmitted to the subscriber's antenna 34 are supplied to mode selection switch 42. When the switch 42 is in the illustrated "pay TV" or first position, the video and audio signals are transmitted to IF detector 48 via tuner 50, whereupon the video signals separated by the IF detector are transmitted to the subscriber's TV set 52 via video polarity switch 54 and the modulator 56. Furthermore, a portion of the separated video signals is supplied to modulator 56 via discriminator 64, high pass filter 69 and sound detector 72, and to oscillator 51 via sync separator 53 and phase detector 55. The oscillator 51 supplies 31.5 KHz signals to sound detector 72, and to phase detector 55 via frequency divider 57. The audio signals separated by IF detector 48 are supplied to the speaker 58 of the subscriber box via gain control means 60 (operable by the count decoding flip-flop switch 76), limiter 62, discirminator 64 and audio amplifier 74. When the switch 42 is in its second position, the audio and video signals from antenna 34 are supplied directly to the TV set via conductor 66. As will be described below, decoder means 40 operates the video polarity switch 54 via the count decoding flip-flop video switch 76 to decode the video and audio signals that were originally coded by the encoder means 12. At the end of a given billing program, the card 10 — which has been punched by the card punch and reader 36 in accordance with the various paid programs enjoyed by the subscriber — is returned by the program subscriber for processing by the card reader 80 and the billing computer 6 to produce the bill 82 which is then sent to the subscriber.

Figure 2:
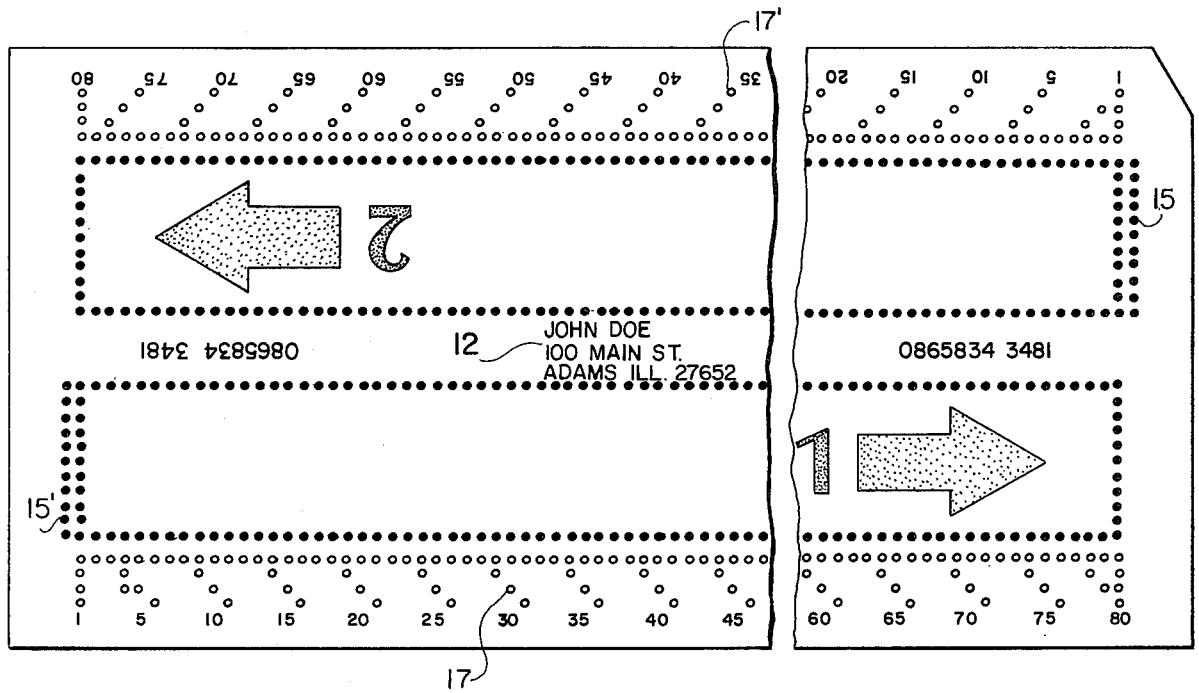
FIG. 2 illustrates in schematic a preferred form of subscriber card, utilized with the system of FIG. 1 for program selection and billing purposes.

In accordance with a characterizing feature of the invention, code computer 4 is operable to control both the encoder 12 to encode the program signal in a distinctive manner, and also the card punch 8, to record this coding information on the card 10 which is sent to the reader. As shown in FIG. 2, the card 10 includes information relating to the subscriber's identification number, the time period, and the geographical area. In a first column 15-15', bit information is provided, relating to the subscriber's box identification number and area and month. The card is also provided with a plurality of column 17-17' of information corresponding to the various coded programs to be presented during the billing period associated with the card 10 and the data required to decode the program.

Figure 3A:
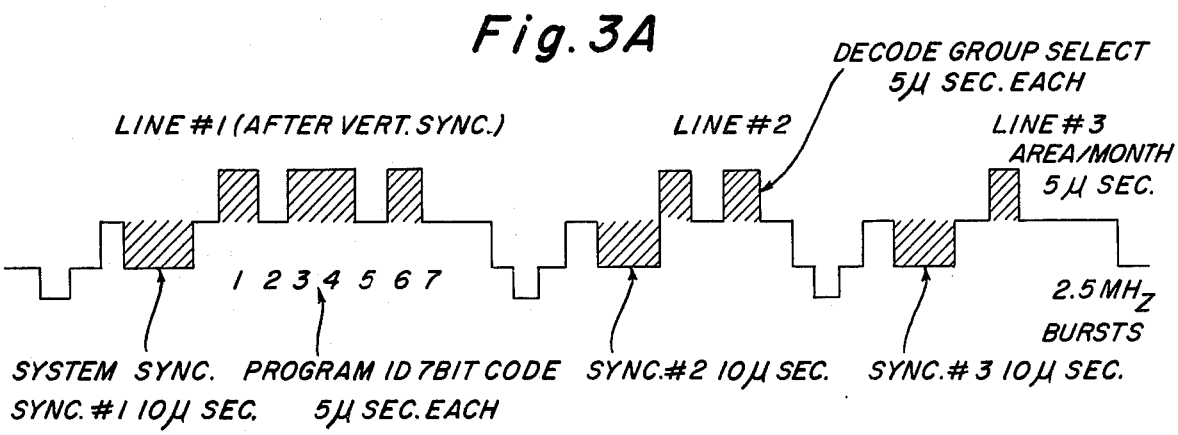
FIGS. 3A and 3B are schematic diagrams illustrating, respectively, the coded program and barker signals that are transmitted to the subscriber.

Referring now to FIG. 3A, the code computer 4 and the encoder 12 serve to electrically invert certain groups of the lines of the transmitted picture, normal unencoded picture lines being transmitted between the inverted lines, whereby the picture, unless decoded by the subscriber, is rendered scrambled and unclear. To further the effectiveness of the encoding, the specific lines selected by the computer 4 for conversion are continually changed. The overall visual impact comprises moving bands in the picture that change width and position. First, the inverted segments have incorrect gray scale and the wrong colors, thereby obscuring the picture. Secondly, the motion due to the changing picture adds discomfort to the obvious lack of legibility. A program for encoding is selected prior to broadcast and the flexibility is such that the programmer can make changes up to the last minute even though the prepunched cards have been distributed to the subscribers, the only limitation being that the programmer know the codes to punch the cards. Consequently, the encoding is dynamic and impossible to predict or circumvent even if one is totally aware of the technical details of the system. Only the correct hardware and card data will permit normal viewing.

The transmitted data (FIG. 3A) includes: system sync, program verification (7 bits), program decode group number (4 bits), and area/month (4 bits). The code information is in the form of a sine wave burst at 2.5 MHz. Video and audio program material are encoded by selectively causing the video and its accompanying subcarrier burst to be inverted on a group-of-lines basis, while the audio FM carrier is deeply amplitude modulated by the same normal-invert pattern. The encoded pattern is controlled by the same computer program that encodes the video. The first and second horizontal "lines" after each vertical sync pulse contain all the necessary information for identifying the specific program transmitted and the decoding of the program material. As shown in FIG. 3A, the control information is in the form of bursts of sine waves at 2.5 MHz, wide bursts being for sync, and the narrow bursts being for data.

Line No. 1 carries system sync for resetting the decoder as well as setting up the necessary state for program comparison with the card code. The sync burst is followed by a seven bit word identifying the program. This is compared with the card reader data and is used to activate a punch inhibit solenoid, as well as to activate an indicator when the check is positive.

The second line, line No. 2, contains a 4 bit word which selects a group of 4 out of 11 possible bits on the card which are assigned to the decoding of a specific number of lines in the field. It actually selects the word that reflects the count for inverted lines. The format is also programmed to change the count of the number of inverted lines from field to field to further obliterate the picture and likewise to modulate the sound.

The third word, lines No. 3, comprises the area/month code.

Figure 3B:
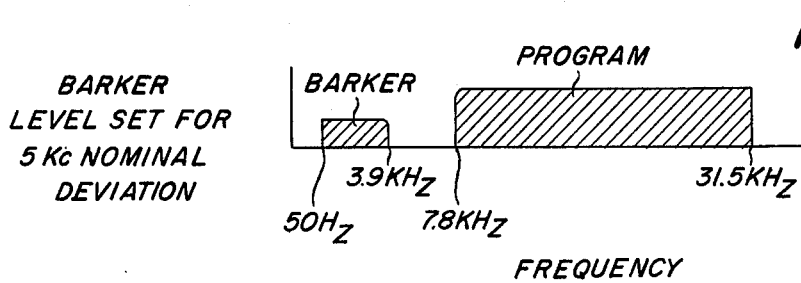

Barker audio source 21 provides a signal (FIG. 3B) which must be available to all receivers during a pay TV broadcast with no requirement for receiver modification. Since the purpose of the barker channel is to transmit announcements rather than program material, the quality can be limited. Since the available communication channel for TV sound is clearly specified and limited, a 3.9 KHz barker channel A serves to favor the program material by utilizing as little of the available program as practical. In addition, to minimize interaction with the program information, the deviation for the barker channel is held to 5 KHz nominal and 15 KHz maximum.

Thus, the bandwidth is more than required for voice and will result in music quality close to that found in radio. The barker channel differs from the normal TV sound in that the deviation is reduced from the standard normal and maximum values and the resultant audio information does not exceed 3.9 KHz. To assure minimum program audio degradation and ease of separation a guard band is set between 3.9 KHz and 7.8 KHz. This permits the barker channel harmonics to fall into an unused portion of the spectrum.

The audio program material is AM and is placed on a 31.5 KHz carrier, thereby allowing a full 14 KHz sideband B down to 7.8 KHz. When transmitted (on the FM sound carrier) the 31.5 KHz carrier is suppressed. Carrier reinsertion is accomplished at the receiver by phase locking an oscillator to twice the horizontal sync pulse repetition frequency.

At the subscriber box, the high pass filter 69 rejects the 50 Hz to 3.9 KHz barker channel, and the suppressed carrier-program audio sidebands are then fed to sound detector 72. The high pass filter 69 extracts the program sound for insertion into the program demodulator 56. The carrier reinsertion system uses a synchronized 31.5 KHz oscillator. The oscillator output is phase locked to the horizontal sync signal.

The barker channel can be received by any television set as normal audio. It differs from the normal broadcast audio only in that the higher frequency information is suppressed. The effect is to yield as much sound information as an ideal broadcast radio receiver with the noise free advantage of FM. This channel is used to advise all viewers of the program offerings as well as advertise the service or other products. Music is received with a quality far in excess of radio but somewhat short of that accompanying standard television.

Figure 4B:
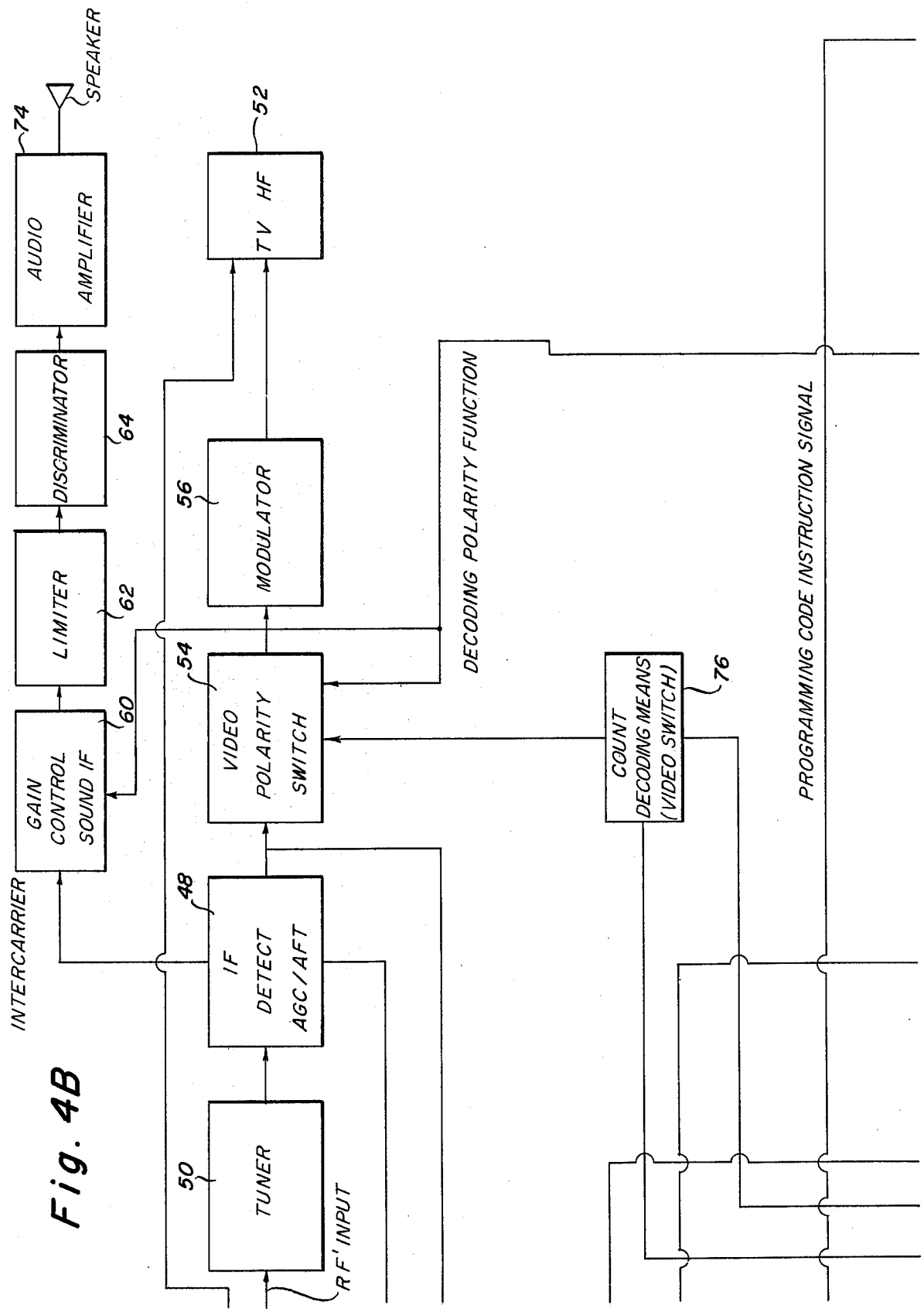

Referring now to FIGS. 4A and 4B, decoder means 40 of FIG. 1 includes horizontal and vertical separators 102 and 104 to which the video signal is supplied from the IF detector 48. A video signal is also applied from the IF detector to the detector 106 via filter 108 and amplifier 110. The horizontal sync signals from separator 102 are supplied to AND gates 112a, 112b and 112c via line counter 114, and the vertical sync is fed to these gates via data gate 116. The outputs of gates 112a and 112b are connected with the inputs of gates 118a and 118b both directly and through delay oscillators 120a and 120b, respectively, and the outputs of gate 112c and detector 106 are supplied to the gate 118c the output of which is connected with 4-bit group register 122.

Figure 4C:
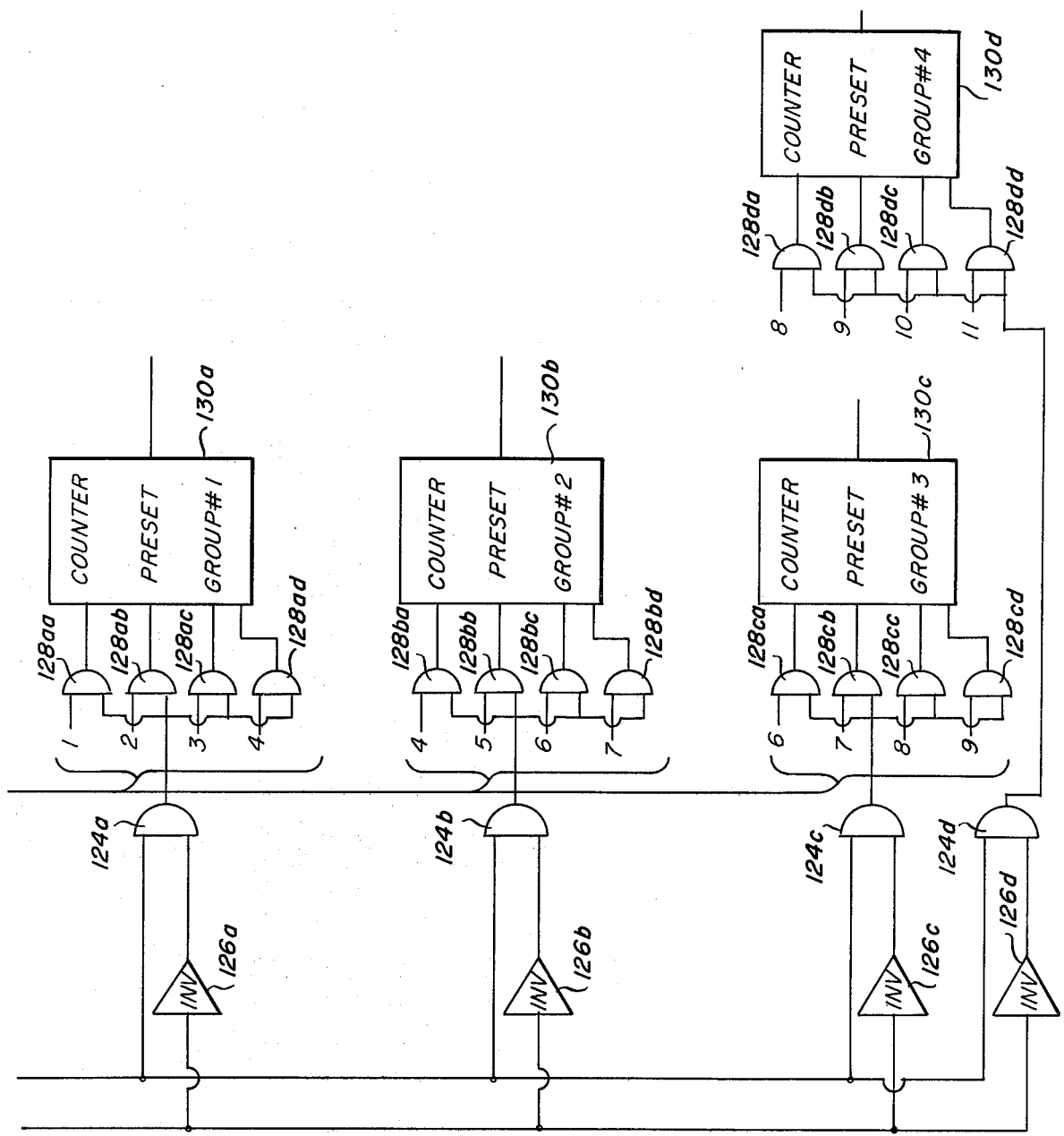

Referring to FIG. 4C, one output of the group register 122 is connected with one input terminal of each of the first group of counter gates 124a, 124b, 124c and 124d, and the other output terminal of the group register is connected with the other input terminal of each of the group counter gates via inverters 126a, 126b, 126c and 126d respectively. The outputs of these first group of counter gates are supplied, respectively, to one of the input terminals of the second group of counter gates 128aa, 128ab, 128ac, 128ad, 128ba, 128bb, 128bc, 128bd, 128ca, 128cb, 128cc, 128da, 128db, 128dc and 128dd, which are associated with the preset line group counters 130a, 130b, 130c and 130d of line groups 1, 2, 3 and 4 respectively. Reference FIGS. 1, 4B and 4C, the outputs of these line group counters are supplied to the count decoding flip flop means 76 which controls the operation of the video polarity switch 54.

The output signal from gate 118b (FIG. 4A) is an off-the-air program code which is supplied to the 7-bit program register 150, (FIG. 4D), which signal is compared by program comparator 152 with program data taken by the card reader 36 (FIGS. 1 and 4D) from appropriate portions of the subscriber's card 10. This program information from the subscriber's card is also sent to the group counters 130a, 130b, 130c, 130d via gates 128aa, 128ab, 128ac, 128ad, 128ba, 128bb, 128bc, 128bd, 128ca, 128cb, 128cc, 128cd, 128da, 128db, 128dc, and 128dd. The program comparator 152 sends a "ready" signal to the card punch and reader 36 to release its solenoid inhibiting means to thereby permit punching of data corresponding to the program selected by the subscriber program selection means 38. Upon operation of the punch means 36, switch 154 is operated to send an enabling signal Vcc to the counter decoding flip flop means 76 via conductor 156. (FIGS. 4B and 4D).

Figure 4D:
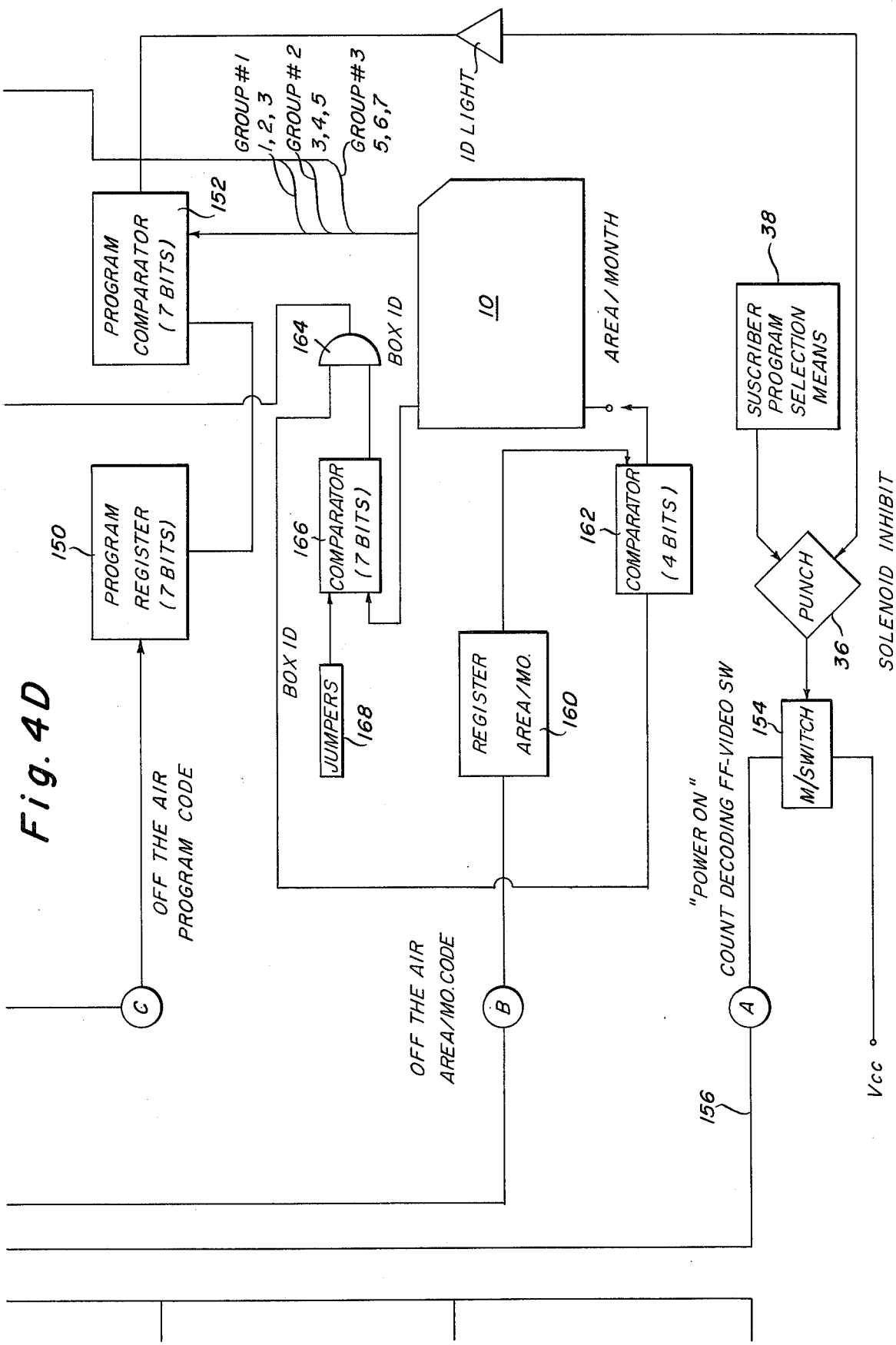

Reference FIGS. 4A and 4D, the off-the-air area/month code signal from gate 118a is supplied to area/month register 160 which sends a signal to the 4-bit comparator 162 which has a second input that is connected with the portion of the card reader that senses the area/month information (FIG. 2) contained on the subscriber's card. The output of comparator 162 is supplied to one input terminal of gate 164.

The Box/card identification least significant bit portion (FIG. 2) of the card is detected by the card reader 36 and is supplied to the 7-bit comparator 166 and is compared with a signal from jumpers 168. The output from the 7-bit box/card comparator is supplied to the other input of gate 164 for transmitting an enabling signal by the video polarity switch 54, and to the gain control means 60.

Thus, the 4-bit register 122 (FIG. 4A) is loaded with a code which was transmitted by the broadcasting station for selecting that one of the counters 130a, 130b, 130c and 130d (FIG. 4C) which is to be used to determine the number of inverted lines which are to be reinverted to their original state by the decoder. A digital weight number of 1, 2 or 3 in digital code is received from the RF link and is loaded by line counter 114 into register 122. This code is transmitted at the end of the field and is stripped off the demodulated RF signal. This control register selects the group of data on the card which is to be used in decoding the incoming field. This part of the system is gated "on" only during the time when there are signals coming over the air that are pertinent to the decoding process. Since the decoding signals are transmitted immediately after the vertical sync pulse, the gate means are opened immediately after the vertical sync pulse. The first step is to acquire the horizontal and vertical sync signals from the off-the-air signal. By counting horizontal sync after the vertical sync, the time period containing the desired information can be identified. The specific portion of signal can be examined to extract this information, a technique called "time domain filtering."

Counter 114 (FIG. 4A) serves to count lines as determined by the sync pulses. More particularly, after the vertical pulse has been completed there are empty lines that do not contain any picture information. The data required for decoding is placed on these empty horizontal lines, with the result that counting identifies the lines that carry the information. Thus, lne 3 contains the area/month code, line 1 contains the bit program identification and line 2 contains the group code select information. The lines utilized do not have to be employed in this sequence. Thus, instead of using the first, second and third lines after vertical sync, other lines (such as the third, fourth and fifth lines, for example) could be used. However, lines 18 and 19 are received for vertical interval test signals and should not be used. The gate system serve as a function or data separator. Gate 118a relates to the area/month code on the card 10, gate 118b relates to the program line for assuring that the code on the card is correct for that program. Gate 118c controls the group select operation controlling counters 130a, 130b, 130c and 130d. The gating system is such that three horizontal lines are triggered by the vertical sync impulse edge so that during this whole period of time these gates are open, said gates remain closed during the rest of the cycle.

Consideration has been given to the 6 to 13 cycles of 3.5 MHz color burst appearng on the rear porch of the sync pulse for adjusting the receiver burst oscillator phase on a line-by-line basis, thereby correcting any phase error of the oscillator which is used to decode the chroma information. To this end, delay means 120a and 120b (FIG. 4A) are connected between gates 112a and 118a, and between gates 112b and 118b. The phase relationship determines the color hue. Adjusting the hue control in a receiver actually phases the incoming signal relative to the oscillator, which changes the color balance from red to green. It is possible in this system to invert selected video lines and reinvert them back again without significant phase distortion. A vertical orange bar has bands of different hues, if the phase error is significant. Depending on magnitude of the error, the horizontal bands vary from a slightly different shade of orange to a noticeably reddish or greenish color. One way of getting around this is to invert the bursts with the lines, not just the line, and so that whatever distortion is incurred by the video, is also incurred by the burst and therefore cancelled out. There is no effort made to block out color, per se. For example, if the picture were light yellow, when inverted the light becomes dark thereby causing a large luminescence change. The chrome phase change is insignificant and the color seems to disappear. The result would appear to be a loss of color rather than a change of hue.

Thus, it is possible to take the burst out or to inhibit the burst from going through filter 108. If the burst is inverted with the video, it will be necessary to reinvert it in decoding process. The switching function that would switch the video will have to start before the burst if it is to be inverted and after same should this prove to be unnecessary. Typically, there are 6 to 13 cycles of burst. There is a minimum of 6 cycles of burst required and a maximum of 13 allowed, but most stations transmit 8 to 12. It there are more than 6 cycles every TV set should operate normally.

As indicated above, any three unused horizontal "lines" after each vertical sync pulse will contain all the necessary information for identifying the specific program transmitted and the decoding of the program material (FIG. 2). The control information is in the form of bursts of sine waves at 2.5 MHz. The wide bursts are for sync, the narrow bursts are data. Line No. 1 carries system sync for resetting the decoder as well as setting up the necessary state for program comparison with the card code. The sync burst is followed by a seven bit word identifying the program. This is compared with the card reader data and is used to activate a punch inhibit solenoid, as well as to activate an indicator when the check is positive. The second line containing a 4-bit word selects a group of 4 out of 11 possible bits on the card, assigned to the decoding of specific number of lines in the field. The third line contains the 4-bit word for the area/month code.

The structure of the encoding means 12 corresponds generally with that of the decoding means 40, and the code computer 4 is of conventional construction and forms no part, per se, of the present invention.

Figure 5:
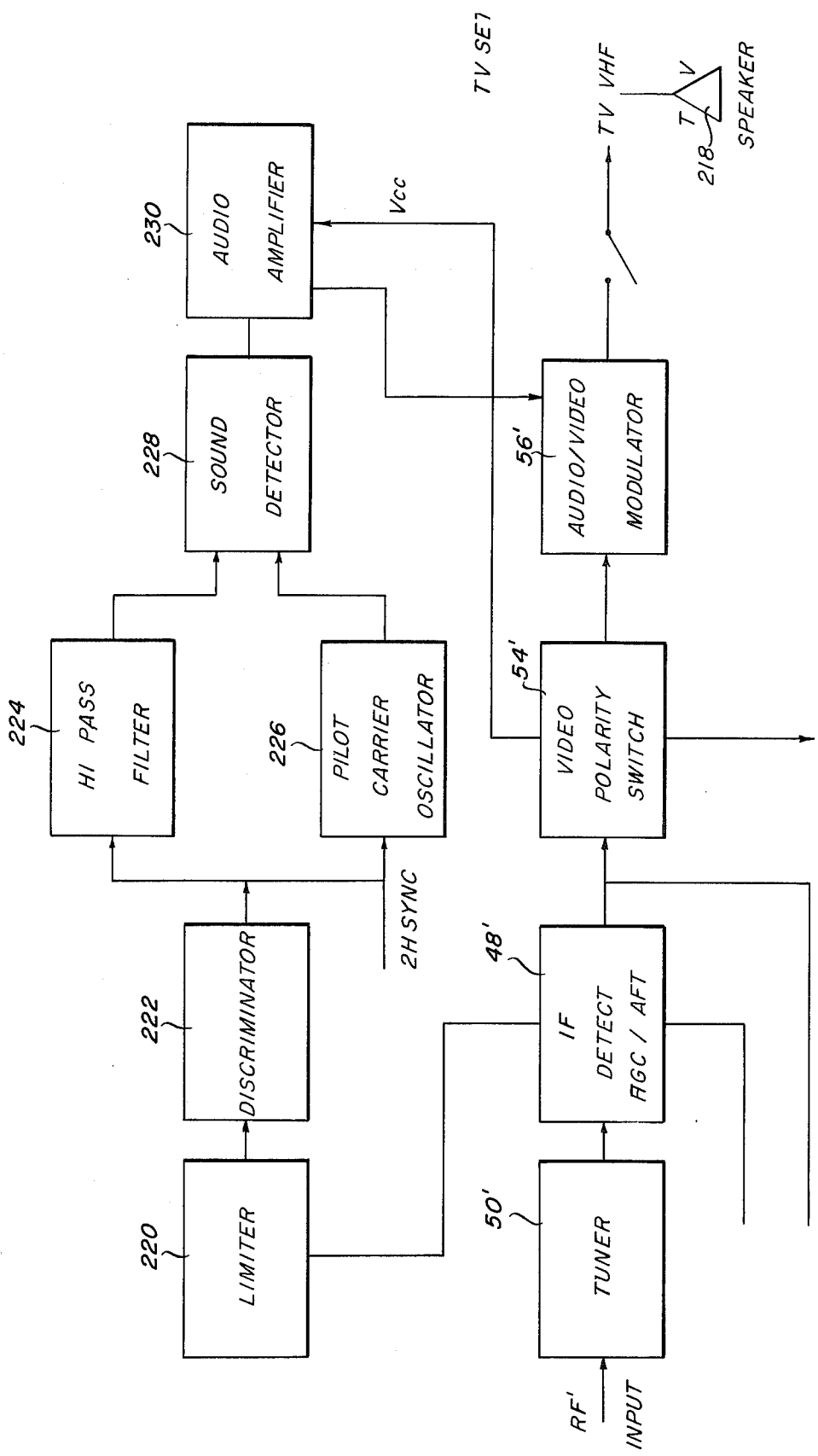
FIG. 5 is a modification of the sound system portion of the decoding means of FIG. 4.

FIG. 5 illustrates a modification of the sound decoding system illustrated in FIGS. 1 and 4. In this embodiment, audio signals from the IF detector 48' are supplied via limiter 220 and discriminator 222, to the high pass filter 224, and a 2H sync signal is supplied to the pilot carrier oscillator 226. The outputs of these two components are mixed and modulated by the sound detector 228 to produce a resulting signal that is amplified by the audio amplifier, the operation of which is controlled by the video polarity switch 54', and is supplied to the TV speaker 218. In this embodiment, a barker channel system similar to that of FIG. 1 is received only on standard receivers receiving the scrambled or encoded picture on UHF.

Various modifications in the disclosed pay TV system have been proposed. For example, instead of using the lines immediately after vertical sync for transmitting codes, preferably the codes are transmitted on three lines, beginning two lines after vertical sync. The chroma burst will not be inverted with the video. Furthermore, by the use of a video/sound modulator, the need for the audio amplifier and loudspeakers in the decoder has been eliminated so that the sound is heard directly over the TV receiver audio system. On the subscriber card, for reasons of security, eleven locations on the card are used for decoding, but the same seven are retained for program identification.

While in accordance with the provisions of the Patent Statutes, the preferred forms and embodiments of the invention have been illustrated and described, it will be apparent to those skilled in the art that various changes and modifications may be made without deviating from the inventive concepts set forth above.

I claim:

1. In a pay TV system including transmitter means arranged at a transmitting station for broadcasting encoded video and audio signals of at least one given program, and receiver means arranged at a receiving station for receiving and decoding said video and audio signals, the improvement which comprises:
    (a) transmitter recording means arranged at the transmitting station (8) for prerecording on a subscriber card (10) program data (14) corresponding to a given program to be transmitted, said program data and additional decoding data being arranged in groups in a numbered column, whereby it may be visually identified by a subscriber as belonging to a specific program;
    (b) said transmitter means including encoder means (12) for inverting first groups of selected picture lines of the program, the remaining second groups of picture lines being transmitted in their normal uninverted condition, said transmitter means also being operable to transmit, during intervals following the vertical sync pulses, a digital code signal including a group select signal for selecting from the card data of the column, a group of data required to decode respective signals, following encoded video signals;
    (c) said receiver means including
        (1) detector means (48) for detecting the encoded video signals;
        (2) means including video polarity switch means (54) for transmitting the video signals to a television receiver;
        (3) card reader means (36) for producing from the subscriber card, when transported to the receiving station, a program line code data signal; and
        (4) decoder means (40) responsive both to the digital program code that is transmitted with the video signals and the program line code instruction signal obtained from the subscriber card for operating said video polarity switch means to reinvert those groups of program lines that were initially inverted by said encoder means.

2. Apparatus as defined in claim 1, wherein said transmitter means is operable to transmit a plurality of encoded programs; wherein said transmitter recording means is operable to record on the subscriber card a plurality of program data corresponding to the encoded programs being transmitted; and further, wherein said receiver means includes subscriber program selection means (38) for selecting a given one of said programs to be viewed by the subscriber.

3. Apparatus as defined in claim 2, and further including subscriber recording means (36) at said receiving station for recording on the subscriber card, when transported to said receiving station, data corresponding to the program selected by the subscriber.

4. Apparatus as defined in claim 3, and further including data processing means (80) arranged at said transmitting station for processing the data recorded on said subscriber card, when returned to the transmitting station, for preparing a bill that is to be sent to the subscriber.

5. Apparatus as defined in claim 3, wherein said video polarity switch means is normally disconnected from said decoder means, and further including means (154) operable by said subscriber recording means upon the selection of a program by the subscriber for connecting said decoder means with said video polarity switch means.

6. Apparatus as defined in claim 5, wherein said transmitter means is also operable to transmit during the time intervals following the vertical sync pulses area/time signals; wherein said transmitter recording means is also operable to record on said subscriber card area/time code data (16) and subscriber identification data (16'); wherein said video polarity switch means is normally disabled; wherein said card reader means is operable to produce signals corresponding with the area/time code and subscriber identification data on said card, respectively; and further including first comparator means for comparing the transmitted area/time code signals with the recorded area/time signals; second comparator means for comparing the subscriber identification data with a standard; and first gate means operable by the outputs of said first and second comparator means for enabling said video polarity switch means.

7. Apparatus as defined in claim 6, wherein said encoder means is operable to alter those portions of the audio signals that correspond with the first groups of picture lines; and further wherein said receiving means includes means operable by said first gate means for restoring to their normal condition those portions of the audio signals that correspond with said first groups of picture lines.

8. Apparatus as defined in claim 7, wherein said decoder means further includes a plurality of program line group counter means; count decoding means connecting the outputs of said line group counter means with said video polarity switch means; and means responsive to the program video signals and to said digital program code for operating said line group counter means.

9. Apparatus as defined in claim 8, wherein said means for operating said line group counter means includes horizontal separator means for separating from the transmitted audio signals the portions of the digital program code information which follows the horizontal sync pulses and which relates to the specific lines which have been inverted, line counter means connected with said horizontal separator means, vertical separator and data gate means for separating the program code and area/time portions from the digital program code information, second gate means operable by the outputs of said line counter and data gate means, and third gate means operable by the output of said second gate means for supplying the video signals to said line group counter means.

10. Apparatus as defined in claim 9, and further including a register connected between said third gate means and said line group counter means; fourth gate means connected between said register and each of said line group counter means, respectively; and means responsive to the program code data on said subscriber card for operating said fourth gate means.

11. The method of transmitting and receiving the encoded signals of at least one pay TV program, which comprises the steps of
    (a) prerecording on a subscriber card at a transmitting station a plurality of program data, said program data and additional decoding data being arranged in groups in a numbered column whereby it may be visually identified by a subscriber as belonging to a specified program;
    (b) transmitting to a subscriber at a receiving station for each program:
        (1) first groups of program picture lines the signals of which have been electrically inverted,
        (2) second groups of program picture lines the signals of which have not been electrically inverted, and
        (3) digital decoding signals including a group select signal for selecting from the card data of the column, a group of data required to decode respective signals, following encoded video signals;
    (c) receiving the transmitted signals and supplying the same to a television receiver at the receiving station via video polarity reversing means;
    (d) recording on the subscriber card, when transported to the receiving station, data corresponding to a selected one of said programs; and
    (e) operating the video polarity reversing means, in accordance with both the corresponding program identifying code on the subscriber card and the decoding signals transmitted with the selected program, to reinvert only those signals of the first groups of picture lines, thereby to supply unimpaired video signals to the television receiver.

12. The method as defined in claim 11, and further including the steps of:
    (f) transmitting to the subscriber for each program an audio signal portion of which corresponding to said first group of picture lines have been altered relative to the remaining portions of the audio signal, the remaining portions of the audio signal being unaltered;
    (g) receiving the audio signal and supplying the same to speaker means via audio signal control means operable by the video polarity reversing means; and
    (h) operating the video polarity reversing means to correct only the altered portions of the audio signal, thereby to supply unimpaired audio signals to the speaker means.

13. The method as defined in claim 11, wherein the prerecording step includes recording on the subscriber card both subscriber identification and area/time codes, and wherein the transmitting step includes transmitting with the decoding signals area/time information signals, and further including the step of enabling the video polarity reversing means only when the decoded area/time signals received by the subscriber correspond with the area/time data recorded on the subscriber card.

14. The method as defined in claim 11, and further including the steps of
    (f) selecting a desired program to be viewed by the subscriber; and (g) processing the data on the subscriber card, when the card is returned to the transmitting station, to prepare a bill for transmittal to the subscriber.

15. The method as defined in claim 11, and further including the steps of (f) transmitting with the audio signal a barker channel signal which affords continuous announcements to the subscriber;

(g) receiving and detecting the barker channel signal; and (h) supplying the detected barker channel signal directly to the speaker of the subscriber's television receiver.

* * * * *